(12) United States Patent
Fan

(10) Patent No.: US 11,841,970 B1
(45) Date of Patent: Dec. 12, 2023

(54) SYSTEMS AND METHODS FOR PREVENTING INFORMATION LEAKAGE

(71) Applicant: Trend Micro Incorporated, Tokyo (JP)

(72) Inventor: Chi-Huang Fan, Taipei (TW)

(73) Assignee: TREND MICRO INCORPORATED, Tokyo (JP)

( * ) Notice: Subject to any disclaimer, the term of this patent is extended or adjusted under 35 U.S.C. 154(b) by 100 days.

(21) Appl. No.: 17/510,914

(22) Filed: Oct. 26, 2021

Related U.S. Application Data

(63) Continuation of application No. 11/862,137, filed on Sep. 26, 2007, now abandoned.

(51) Int. Cl.
*G06F 21/62* (2013.01)
*G06F 21/31* (2013.01)
*G06F 21/55* (2013.01)
*G06F 21/60* (2013.01)

(52) U.S. Cl.
CPC .......... *G06F 21/6227* (2013.01); *G06F 21/31* (2013.01); *G06F 21/554* (2013.01); *G06F 21/602* (2013.01); *G06F 21/604* (2013.01)

(58) Field of Classification Search
CPC .... G06F 21/6227; G06F 21/31; G06F 21/554; G06F 21/602; G06F 21/604
See application file for complete search history.

(56) References Cited

U.S. PATENT DOCUMENTS

| | | | | |
|---|---|---|---|---|
| 6,047,312 A | * | 4/2000 | Brooks | G06F 21/604 709/215 |
| 2004/0107342 A1 | * | 6/2004 | Pham | H04L 67/1097 713/165 |
| 2006/0117178 A1 | * | 6/2006 | Miyamoto | G06F 21/6209 713/165 |
| 2006/0190988 A1 | * | 8/2006 | Adams | G06F 21/6236 726/1 |
| 2008/0098391 A1 | * | 4/2008 | Medvedev | G06F 9/44563 718/1 |
| 2008/0295174 A1 | * | 11/2008 | Fahmy | G06F 21/57 380/59 |
| 2017/0364681 A1 | * | 12/2017 | Roguine | G06F 21/566 |

FOREIGN PATENT DOCUMENTS

| | | | | |
|---|---|---|---|---|
| CA | 2616956 | * | 2/2007 | ............ G06F 17/24 |
| EP | 1662356 A2 | * | 5/2006 | ............ G06F 21/556 |
| WO | WO-0030012 A1 | * | 5/2000 | ............ G06F 19/321 |
| WO | WO-2009095413 A2 | * | 8/2009 | ......... G06F 21/6218 |

\* cited by examiner

*Primary Examiner* — Sarah Su
(74) *Attorney, Agent, or Firm* — Beyer Law Group LLP

(57) ABSTRACT

A system for preventing information leakage due to access by an application to a file is provided. The system for preventing information leakage includes an application identification module configured to obtain data associated with the application. The system for preventing information leakage also includes an association table containing file-type data and trusted-application data. In addition, the system also includes an access control module to determine the application identifier and the association table. The system for preventing information leakage is configured to determine whether to deny content access by the application to content of the file as saved in the file.

10 Claims, 3 Drawing Sheets

SYSTEMS AND METHODS FOR PREVENTING INFORMATION LEAKAGE

BACKGROUND OF THE INVENTION

Protection for confidential information has been one of the major concerns of enterprises as well as individuals. As more data (including confidential information and important data) are stored in digital formats in computers in a networked environment, information leakage prevention (ILP) become more important since digital data and malicious applications implemented for stealing the digital data may be easily transmitted through computer networks.

On a computer network, a malicious party may utilize one or more malicious applications (or programs/processes) in an attempt to obtain confidential information. For example, spyware or backdoor software applications may be utilized to steal confidential data contained in word processor files (e.g., Microsoft® Word® files), spreadsheet files (e.g., Microsoft® Excel® files), and/or source code files. As another example, ransomware applications may be utilized to hijack a file in order to obtain certain confidential information not stored in the file. For instance, a ransomware application may threaten to delete or encrypt the content of a file that contains important data if a confidential information holder (e.g., a credit card holder) does not provide the requested confidential information (e.g., the credit card number) within a certain amount of time.

Developed for protecting confidential information, conventional ILP techniques typically rely on encryption and passwords to prevent unauthorized access to the true content of files. For example, a typical ILP program may encrypt the content of a file and implement one or more passwords for decrypting the encryption. In general, the ILP program may allow various applications to access the as-saved encrypted content, but may not decrypt the encrypted content unless a valid password is provided, such that the true content of the file may be protected.

However, the conventional ILP techniques may be insufficient in view of certain emerging malicious applications and data access techniques. For example, a malicious party may utilize a spyware application to steal a copy of the encrypted content, and then utilize a different technique to decrypt the encrypted content. Further, a ransomware application may delete or further encrypt the encrypted content without decrypting the encrypted content, in an attempt to obtain confidential information that is not part of the encrypted content.

SUMMARY OF INVENTION

The invention relates, in an embodiment, to a system for preventing information leakage due to access by an application to a file. The system for preventing information leakage includes an application identification module configured to obtain data associated with the application. The system for preventing information leakage also includes an association table containing file-type data and trusted-application data. In addition, the system also includes an access control module to determine the application identifier and the association table. The system for preventing information leakage is configured to determine whether to deny content access by the application to content of the file as saved in the file.

The above summary relates to only one of the many embodiments of the invention disclosed herein and is not intended to limit the scope of the invention, which is set forth in the claims herein. These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

Figure 1A:
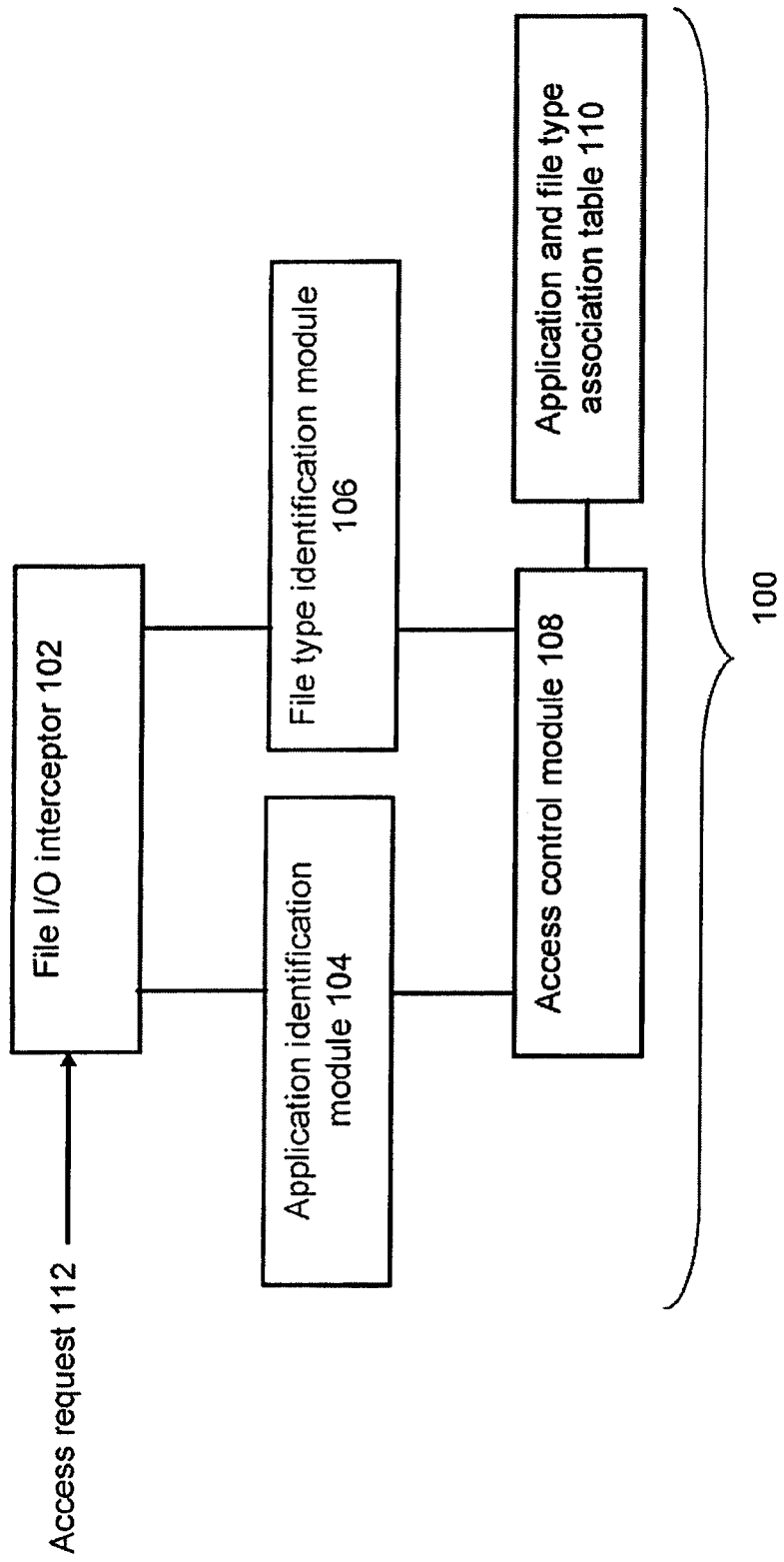
FIG. 1A illustrates a block diagram of an information leakage prevention (ILP) system in accordance with one or more embodiments of the present invention.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well-known process steps and/or structures have not been described in detail in order to not unnecessarily obscure the present invention.

Various embodiments are described herein below, including methods and techniques. It should be kept in mind that the invention might also cover articles of manufacture that, includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

One or more embodiments of the present invention relate to a system for preventing information leakage that results from access by an application (i.e., a requesting application) to a file (i.e., a requested file). As discussed above, by relying on encryption and password protection, a prior art ILP mechanism may generally allow content access by applications to the encrypted content of files. In contrast, the system according to the invention may selectively deny content access by applications to as-saved file content, which may be encrypted, decrypted, or unencrypted. To elaborate, the as-saved file content represents the data in the state that such data is saved in the file, irrespective whether such state is an encrypted, decrypted, or unencrypted state. In one or more embodiments, the as-saved file content may be the content as encrypted, but not the content as decrypted.

The system may include an interceptor configured to intercept an access request. The access request may pertain to the (potential) content access by the application to the content of the file. The access request may be made by, for example, the application or another party (e.g., a second application different from the application). The interceptor may be implemented based on a file system filter driver protocol for a given operating system.

The system may also include an application identification module configured to obtain at least a requesting-application identifier using data associated with the application. The requesting-application identifier may include a hash value or may be represented by a hash value. For example, the application identification module mw utilize a hash function to process the content of the application to generate the hash value. The hash function may utilize one or more of well-known hash algorithms, such as SHA-1, MD5, etc. If SHA-1 is utilized, the hash value may be a 40-character string.

The system may also include an association table containing file-type data and trusted-application data. The file-type data may include at least data representing a file type associated with the (requested) file. The trusted-application data may include data representing one or more trusted applications. The one or more trusted applications may be associated with the file type according to the association table. In one or more embodiments, the one or more trusted applications may represent a plurality of applications allowed to access the content of files associated with the file type.

In the association table, the file-type data may include a file-type identifier, which is different from a filename extension, for each of a plurality of file types. The file-type identifier may be a numerical identifier or an alphanumerical identifier. The file-type data may also include a filename extension for each file type.

In the association table, the trusted-application data may include a plurality of trusted-application identifiers representing the plurality of (trusted) applications. The plurality of applications may be associated with a plurality of file types according to the association table. The trusted-application identifiers may include hash values generated by at least a hash function, which may utilize one or more of well-known hash algorithms, such as SHA-1, MD5, etc. The same hash function may also be utilized to generate the requesting-application identifier discussed above. The hash values may have unique values and may have the same length. The trusted-application data may further include information of locations (e.g., file paths) and/or filenames associated with the applications.

The system may also include an access control module configured to determine, utilizing at least the requesting-application identifier and the association table, whether to deny content access by the application to the as-saved content of the file. If the requesting-application identifier is not associated with the file type, i.e., if the application is not a trusted application, the access control module may deny the content access by the application to the as-saved content of the file. For example, if the application is not a trusted application, the access control module may prevent the application from duplicating, reading, and/or altering (e.g., deleting, encrypting, decrypting, and/or writing to) any portion of the content of the file.

The system may also include a file type identification module configured to examine the format of the content of the file to determine the file type. For example, the file type identification module may include a virus scanning application programming interface (VSAPI) for scanning the content of the file. Output of the file type identification module also may be utilized by the access control module to determine whether to deny the content access by the application to the as-saved file content.

One or more embodiments of the present invention relate to a method for preventing information leakage resulted from access by a (requesting) application to a (requested) file. The method may include intercepting an access request. The access request, made by the application or another party (e.g., a second application different from the application), may pertain to content access by the application to the as-saved file content. The as-saved content in the file may be encrypted, decrypted, or unencrypted.

The method may also include obtaining at least a requesting-application identifier utilizing data associated with the application. The requesting-application identifier may include a hash value. For example, the step of obtaining may include utilizing at least a hash function to process the content of the application to generate the hash value.

The method may also include determining a file type associated with the file. The step of determining may include examining the format of the content of the file, for example, utilizing a VSAPI.

The method may also include deciding, using at least the requesting-application identifier and the file type, whether to deny the content access by the application to the as-saved file content. For example, the method may include determining whether the requesting-application identifier is associated with the file type.

The method may further include denying the content access by the application to the as-saved file content if the requesting-application identifier is not associated with the file type. As an example, the method may include preventing the application from duplicating, reading, and/or altering the content of the file.

The method may also include creating/preparing an association table for associating trusted-application data and file-type data. For example, the method may also include generating one or more trusted-application identifiers using at least a hash function. The one or more trusted-application identifiers may represent one or more applications allowed to access the content of files associated with the file type. The one or more applications may represent a plurality of applications. The trusted-application identifiers may include unique hash values of the same length.

The method may also include assigning a file-type identifier for the file type. The file-type identifier may be different from a filename extension. For example, the file-type identifier may be a numerical or alphanumerical identifier.

The features and advantages of the invention may be better understood with reference to the figures and discussions that follow.

FIG. 1A illustrates a block diagram of an information leakage prevention (ILP) system 100 (system 100) in accordance with one or more embodiments of the present invention. In contrast with typical ILP systems that generally allow access to encrypted content of files, system 100 may selectively deny content access by applications to as-saved file content, which may be encrypted, decrypted, or unencrypted. System 100 may include a file input/output (I/O) interceptor 102 (interceptor 102), an application identification module 104, a file type identification module 106, an access control module 108, and an application and file type association table 110 (association table 110).

Interceptor 102 may be implemented based on a file system filter driver protocol or a similar protocol for a certain operation system, e.g., Windows® (available from Microsoft Corporation, www.microsoft.com) or Linux® (available, for example, from Linux Online Inc., www.linux.org). Interceptor 102 may be configured to intercept a file access request, such as access request 112 illustrated in the example of FIG. 1A. The access request may be addressed to the operating system of a computer for (potential) content access by an application, i.e., a requesting application, to the content of a file, i.e., a requested file, stored in the computer. The access request may be made by the application or another party (e.g., a second application different from the application).

Identification module 104 may be configured to obtain at least a requesting-application identifier for the application using data associated with the application. In one or more embodiments, application identification module 104 may utilize a hash function to process the content of the application to generate a hash value, which may serve as at least part of the requesting-application identifier. In one or more embodiments, the hash value may represent the requesting-application identifier.

The hash function may utilize one or more of well-known hash algorithms (or digest algorithms), such as SHA-1, MD5, etc. Accordingly, requesting-application identifiers (represented by hash values) for different applications may have the same length. For example, if SHA-1 is utilized, each requesting-application identifier may be a 40-character string. Further, each of the different applications may have a unique requesting-application identifier.

In one or more embodiment, identification module 104 may obtain information pertaining to the location (or file path) and/or the filename of the application, for example, utilizing the access request intercepted by interceptor 102. However, identification module 104 may not rely on only the location and/or filename information to determine the identity of the application, since some malicious applications may be able to replace a trusted application to have the filename and the location information the trusted application. Identification module 104 may utilize requesting-application identifiers (e.g., hash values) to identify such malicious applications and/or to distinguish the malicious applications from trusted applications. Advantageously, malicious applications in disguise may be identified.

File type identification module 106 may be configured to examine the format of the content of the requested file, in order to determine the true file type of the file. For example, the file type identification module 106 may be implemented utilizing a virus scanning application programming interface (VSAPI) for scanning the content of the file.

In one or more embodiment, file type identification module 106 may obtain information pertaining to the filename extension of the file. However, file type identification module 106 may not rely on only the filename extension information to determine the file type of the file, since filename extensions may be modified by users or applications. Advantageously, by scanning file content, file type identification module 106 can identify true file types of files based on content formats of the files, even if filename extensions of the files have been modified.

Access control module 108 may be configured to determine whether to deny content access by the application to the as-saved file content. Access control module 108 may make the decision utilizing the requesting-application identifier of the application provided by application identification module 104, the file type of the file provided by file type identification module 106, and association table 110. Association table 110, which will be further discussed below with reference to FIG. 1B, may contain association information pertaining to various file types and trusted applications that are allowed to access files associated with the file types.

If, according to association table 110, the requesting-application identifier is not associated with the file type, i.e., if the application is not a trusted application, access control module 108 may deny the content access by the application to the as-saved file content. For example, if the application is not a trusted application, the access control module 108 may prevent the application from duplicating, reading, and/or altering (e.g., deleting, encrypting, decrypting, and/or writing to) any portion of the content of the file. If the requesting-application identifier is associated with the file type according to association table 110, control module 108 may allow the application to access the content of the file.

System 100 may also include one or more encryption and/or password protection mechanisms (not shown in FIG. 1A) that are well known in the art.

Figure 1B:
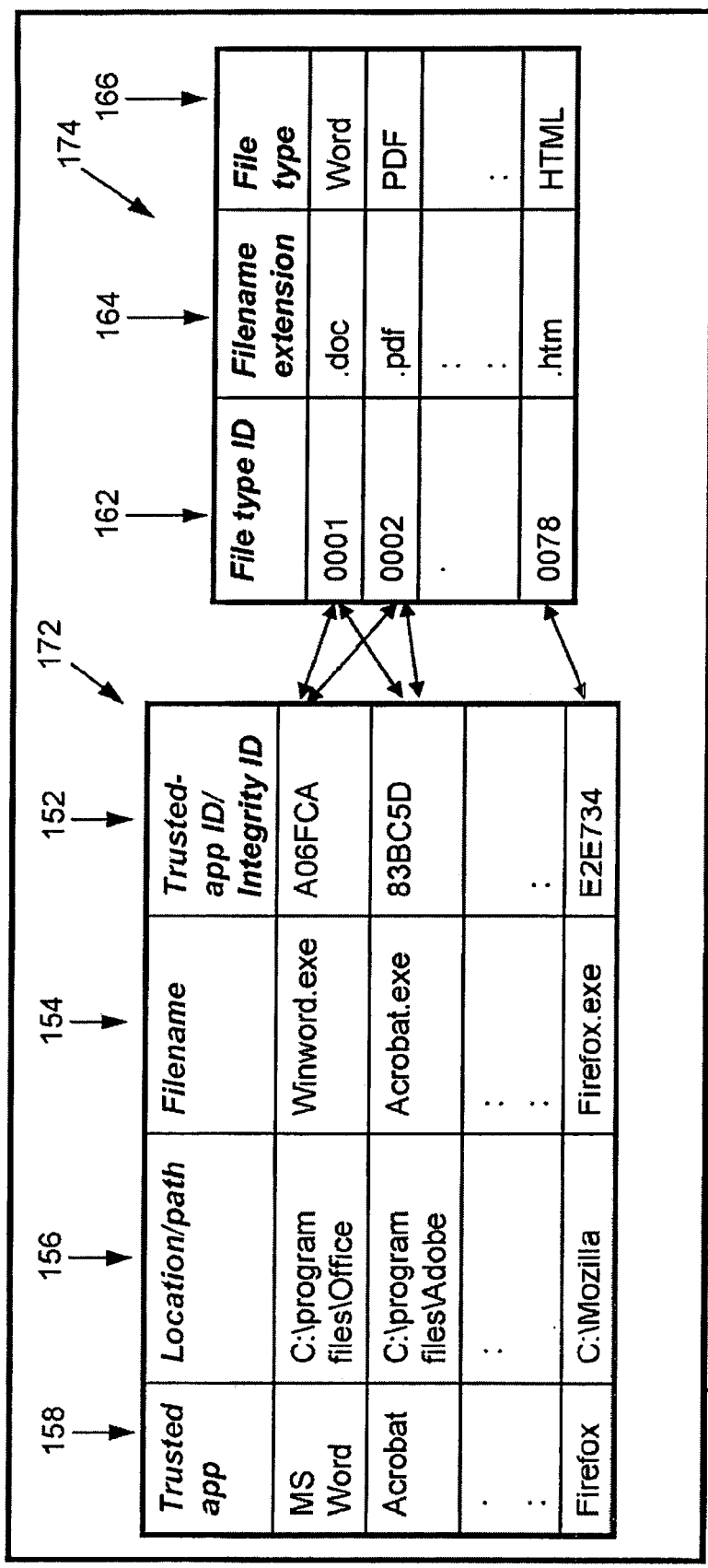
FIG. 1B illustrates a schematic representation of an association table in accordance with one or more embodiments of the present invention.

FIG. 1B illustrates a schematic representation of association table 110 in accordance with one or more embodiments of the present invention. Association table 110 may be configured to contain file-type data 174 and trusted-application data 172. Association table 110 may also contain information pertaining to association between file-type data 174 and trusted-application data 172.

File-type data 174 may include filename extensions 164 and file-type identifiers 162 associated with various file types 166. For example, as illustrated in the example of FIG. 1B, the file type "Word" (or "Microsoft® Word®") may be associated with the filename extension ".doc" and the file type identifier "0001." Filename extensions 164 may be modified by users or applications, and association table 110 may update filename extensions 164 accordingly. File-type identifiers 162 may represent a set of numerical identifiers and/or alphanumerical identifiers assigned to file types 166. Each file type may be associated with a unique numerical or alphanumerical file-type identifier.

Trusted-application data 172 may include trusted-application identifiers 152 (or integrity identifiers 152) representing trusted applications 158 associated with at least one of file types 166. A trusted application associated a file type is allowed to access the content of files associated with file type. Trusted-application identifiers 152 may include (or may be represented by) hash values generated by at least a hash function, which may utilize one or more of well-known hash algorithms, such as SHA-1, MD5, etc. The hash values may have unique values and may have the same length, regardless of the different sizes of trusted applications 158. The scheme (including the hash function) utilized for generating trusted-application identifiers 152 may be the same as the scheme employed by application identification module 104 (discussed with reference to FIG. 1A) for generating the requesting-application identifier. Trusted-application data 172 may also include locations/paths 156 and/or filenames 154 associated with trusted applications 158 and trusted-application identifiers 152.

Association table 110 may also contain information pertaining to association between at least trusted-application identifiers 152 and at least file-type identifiers 162. The association may further include locations/paths 156, filenames 154, and filename extensions 164.

According to association table 110, a file type (among file types 166) may be associated with a plurality of applications (among trusted applications 158). For example, the file type "Word" may be associated with at least Microsoft® Word® (available from Microsoft Corporation, www.microsoft.com) and Adobe® Acrobat® (available from Adobe Systems Inc., www.adobe.com). A trusted application may be associated with a plurality of file types.

Figure 2:
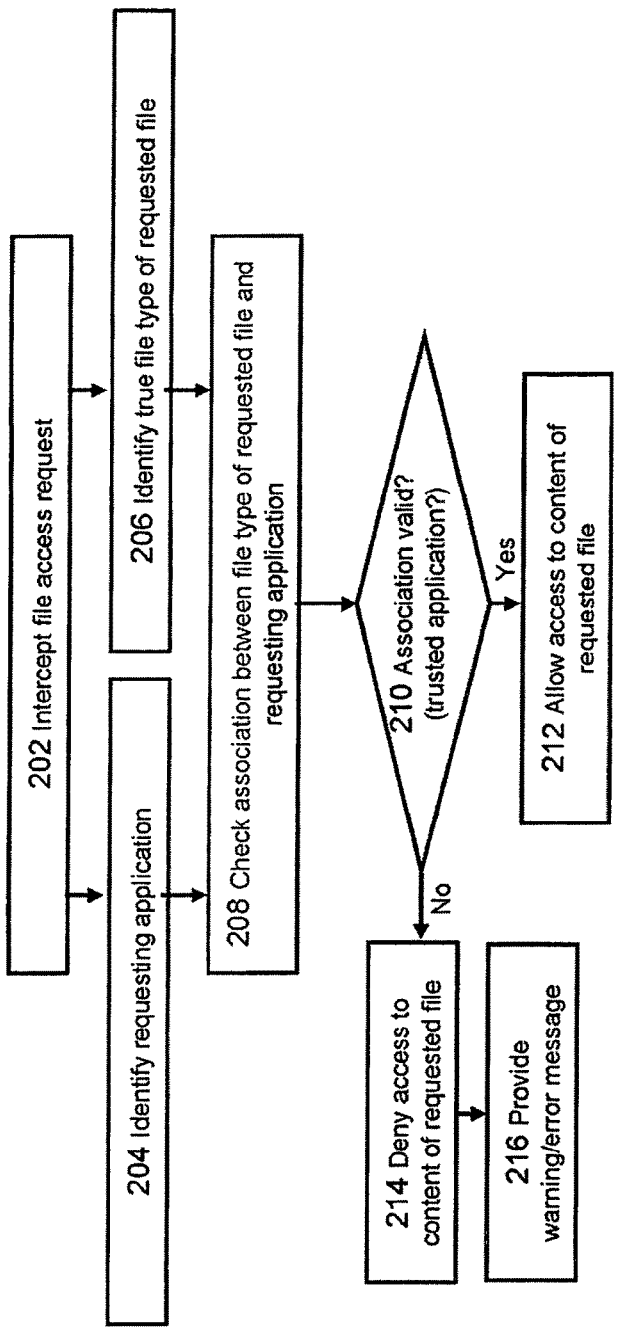
FIG. 2 illustrates a flowchart of an ILP method in accordance with one or more embodiments of the present invention.

FIG. 2 illustrates a flowchart of an ILP method in accordance with one or more embodiments of the present invention. The method may be implemented, for example, utilizing system 100 and association table 110 illustrated in the examples of FIGS. 1A-B.

The method may start with step 202, in which interceptor 102 may intercept a file access request. The File access request may pertain to content access by a requesting application to the content of a requested file.

In step 204, application identification module 104 may identify the requesting application, for example, by obtaining at least the requesting-application identifier (e.g., the hash value) associated with the requesting application.

In step 206, file type identification module 106 may identify the true file type of the requested file, for example, by examining the content format of the requested file.

In step 208, access control module 108 may check whether the file type of the requested file and the requesting application (e.g., represented by the requesting-application identifier) are associated according to association table 110.

In step 210, access control module 108 may decide whether there is a valid association between the file type of the requested file and the requesting application, i.e., whether the requesting application is a trusted application. If the requesting application is determined to be a trusted application, control may be transferred to step 212, in which access control module 108 may allow the requesting application to access the content of the requested file. If the requesting application is determined to be not a trusted application, control may be transferred to step 214.

In step 214, access control module 108 may deny the access request and may block the requesting application from accessing the content of the requested file. In particular, access control module 108 may prevent the requesting application from duplicating, reading, and/or altering (e.g., deleting, encrypting, decrypting, and/or writing to) any portion of the content of the requested file.

In step 216, access control module 108 may provide a warning message and/or an error message through the computer in which the requested file is stored, for example, to an authorized user of the computer.

The method may also include steps pertaining to creating/preparing association table 110 (illustrated in the example of FIG. 1B). For example, the method may also include generating trusted-application identifiers 152 utilizing at least a hash function. The method may also include assigning file-type identifiers 162 for file types 166. File types 166 may include the file type associated with the requested file.

The method may also include implementing encryption and password protection utilizing one or more processes that are well known in the art.

As can be appreciated from the foregoing, embodiments of the present invention may utilize unique application identifiers to identify applications. Accordingly, malicious applications (including spyware, backdoor software, and ransomware applications), even if disguised as trusted applications with trusted location and filename information, may be accurately identified.

Further, embodiments of the present invention may utilize content formats to identify file types. Accordingly, file types may be correctly identified even if filename extensions of files have been modified.

With accurate identification of applications and file types as well as association between trusted applications and file types, embodiments of the invention may effectively block various malicious applications from duplicating, reading, and altering the content of files. Advantageously, potential information leakage associated with actions of the malicious applications may be prevented.

While this invention has been described in terms of several embodiments, there are alterations, permutations, and equivalents, which fall within the scope of this invention. It should also be noted that there are many alternative ways of implementing the methods and apparatuses of the present invention. Additionally, it is intended that the abstract section, having a limit to the number of words that can be provided, be furnished for convenience to the reader and not to be construed as limiting of the claims herein. It is therefore intended that the following appended claims be interpreted as including all such alterations, permutations, and equivalents as fall within the true spirit and scope of the present invention.

What is claimed is:

1. A method for preventing information leakage, the method comprising:
    intercepting a file access request made by a requesting application to access a file on a computer;
    obtaining an identifier of the requesting application;
    examining a format of a content of the file to determine a file type associated with the file;
    consulting an association table to determine if the requesting application is a trusted application, the association table including a listing of applications and corresponding file types that have associations with the applications;
    allowing the requesting application to access the file if the association table indicates that the requesting application is a trusted application based on the requesting application being associated with the file type of the file in the association table; and
    blocking the requesting application from accessing the file if the association table indicates that the requesting application is not a trusted application based on the requesting application not being associated with the file type of the file in the association table.

2. The method of claim 1, further comprising:
    in response to the association table indicating that the requesting application is not a trusted application, providing a warning to an authorized user of the computer.

3. The method of claim 1, wherein the identifier of the requesting application includes a hash of the requesting application.

4. The method of claim 1, wherein the association table includes a hash of the requesting application and a location of the requesting application on the computer.

5. The method of claim 1, wherein blocking the requesting application from accessing the file includes preventing the requesting application from duplicating the file.

6. A computer comprising a processor and a memory, the memory storing instructions that when executed by the processor cause the computer to:
    intercept a file access request made by a requesting application to access a file on the computer;
    obtain an identifier of the requesting application;
    examine a format of a content of the file to determine a file type associated with the file;
    consult an association table to determine if the requesting application is a trusted application, the association table including a listing of applications and corresponding file types that have associations with the applications;

allow the requesting application to access the file if the association table indicates that the requesting application is a trusted application based on the requesting application being associated with the file type of the file in the association table; and block the requesting application from accessing the file if the association table indicates that the requesting application is not a trusted application based on the requesting application not being associated with the file type of the file in the association table.

7. The computer of claim 6, wherein the instructions, when executed by the processor, cause the computer to provide a warning to an authorized user of the computer in response to the association table indicating that the requesting application is not a trusted application.

8. The computer of claim 6, wherein the identifier of the requesting application includes a hash of the requesting application.

9. The computer of claim 6, wherein the association table includes a hash of the requesting application and a location of the requesting application on the computer.

10. The computer of claim 6, wherein the instructions, when executed by the processor, cause the computer to block the requesting application from accessing the file by preventing the requesting application from duplicating the file.

* * * * *